United States Patent [19]

Chretien et al.

[11] Patent Number: 4,893,686
[45] Date of Patent: Jan. 16, 1990

[54] DRAFT PROTECTION DEVICE FOR PRECISION BALANCES

[75] Inventors: Philippe Chretien, Dietlikon; Bruno Bauert, Ebertswil, both of Switzerland

[73] Assignee: Mettler Instrumente AG, Greifensee, Switzerland

[21] Appl. No.: 345,780

[22] Filed: May 1, 1989

[30] Foreign Application Priority Data

Jun. 21, 1988 [CH] Switzerland ............... 2379/88

[51] Int. Cl.⁴ ............................................ G01G 21/28
[52] U.S. Cl. ..................................... 177/180; 177/238
[58] Field of Search ................ 177/180, 181, 182, 238

[56] References Cited

U.S. PATENT DOCUMENTS

| | | | |
|---|---|---|---|
| 2,732,199 | 1/1956 | Meinig | 177/181 |
| 4,664,207 | 5/1987 | Knothe et al. | 177/181 |
| 4,762,190 | 8/1988 | Meixner | 177/181 |
| 4,798,250 | 1/1989 | Knothe et al. | 177/181 |

*Primary Examiner*—George H. Miller, Jr.
*Attorney, Agent, or Firm*—Toren, McGeady & Associates

[57] ABSTRACT

A draft protection device for a precision balance including an exposed weighing dish. The device includes at least two hollow bodies of similar shape which can be telescopically slid one into the other. The hollow bodies are maintained in the desired position by a self-locking intermediate ring placed on the inner second hollow body.

11 Claims, 2 Drawing Sheets

DRAFT PROTECTION DEVICE FOR PRECISION BALANCES

BACKGROUND OF THE INVENTION

1. Field of the Invention

The present invention relates to a draft protection device or windscreen for precision balances with an exposed weighing dish. The draft protection device includes a hollow body which is open at the top and the bottom thereof and which surrounds the weighing dish.

2. Description of the Related Art

In modern precision balances having high resolution and an exposed weighing dish, even small movements of the air in a room already influence the accuracy of weighing.

Swiss Patent No. 560 893 discloses a draft protection device which includes a hollow body which can be placed on the balance and which is open at the top and the bottom. The hollow body is composed of several partial walls which are connected to each other. The contacting edges of the partial walls are constructed as joints. The known hollow body is constructed in such a way that it is possible to join one above the other two or more hollow bodies which are of equal height and equal construction.

This known draft protection device has the disadvantage that it does not have an aesthetically satisfactory appearance and that its height cannot be easily adjusted to the material or article being weighed. The high draft protector composed of several elements which are stacked one above the other in the manner of columns can easily tip over when touched or, when the elements are riveted or glued together, the draft protector cannot subsequently be adjusted to the material or article being weighed.

It is, therefore, the primary object of the present invention to provide a draft protection device whose height can always be adjusted to the respective material or article being weighed and whose height can be changed at any time and which requires only little space when it is being transported or when it is not in use.

SUMMARY OF THE INVENTION

In accordance with the present invention, a draft protection device or windscreen includes a first hollow body and at least a second, similarly constructed hollow body which is telescopically slidably mounted on the first hollow body.

In accordance with a preferred feature of the invention, an intermediate ring is placed on the outer surface of the upper hollow body which engages the first hollow body. This intermediate ring prevents the upper hollow body from sliding into the lower hollow body.

Depending upon the configuration of the balance, i.e., of the weighing dish, the hollow body may have a round, oval, rectangular or polygonal cross-section.

When the lower hollow body is placed laterally of the balance on the table on which the balance stands, it is ensured that vibrations cannot be transmitted to the balance housing when the lower hollow body is touched.

A cover placed on the uppermost hollow body ensures that the material or article being weighed cannot be touched. When the balance is not being used, this cover prevents dust from being deposited on the weighing dish.

The various features of novelty which characterize the invention are pointed out with particularity in the claims annexed to and forming a part of this disclosure. For a better understanding of the invention, its operating advantages attained by its use, reference should be had to the drawings and descriptive matter in which there are illustrated and described preferred embodiments of the invention.

DESCRIPTION OF THE PREFERRED EMBODIMENTS

Figure 1:
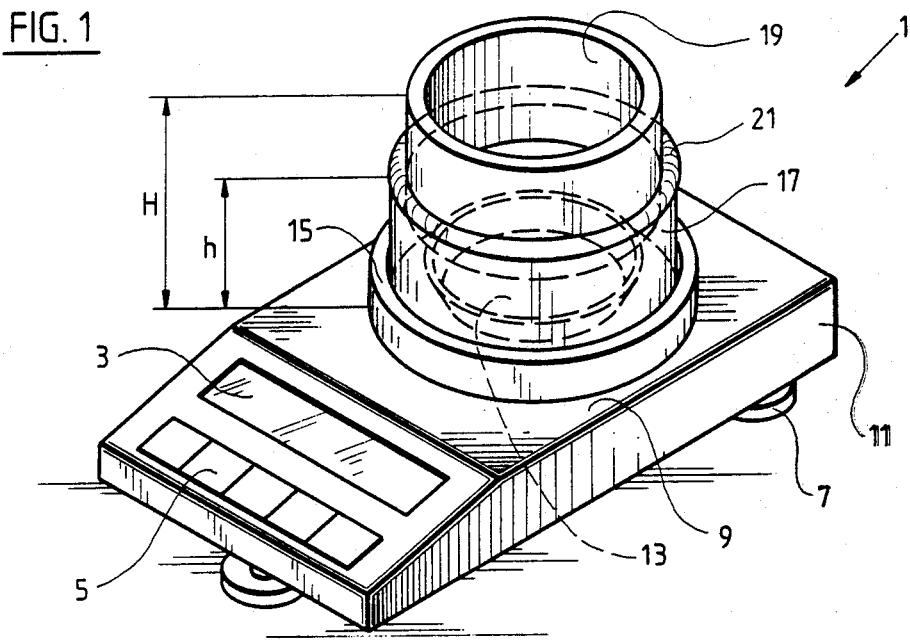
FIG. 1 is a perspective view of a balance with a round weighing dish and of a round draft protection device placed on the surface of the balance housing.

As schematically illustrated in FIG. 1 of the drawing, a precision balance 1 has an indicating means 3 and operating elements 5 and is standing on three legs 7. A weighing dish 13 is placed on the upper side 9 of the balance housing 11. The weighing dish 13 is connected to a weighing mechanism, not shown. The weighing dish 13 is surrounded by a ring 15 of sheet metal which projects upwardly from upper side 9 of balance housing 11. The ring 15 of sheet metal has a round cross-section corresponding to the weighing dish 13 and is spaced apart from the periphery of the weighing dish 13.

A cylindrical first or lower hollow body 17 which is open at the top and the bottom thereof is inserted in the ring 15 and is placed on the top surface 9 of the balance housing 11. The first hollow body 17 could also surround the ring 15 on the outside or it could be placed on the ring 15.

A second or upper hollow body 19 which is of similar construction as the first hollow body and is also open at the top and bottom thereof, and whose outer diameter is slightly smaller than the inner diameter of the first hollow body, is slid into the latter and is held by an intermediate ring 21. The intermediate ring 21 is placed in a self-locking manner on the outer surface of the second hollow body 19 and is composed of an elastic material, for example, rubber or plastics material, or of a springy metal whose surface is provided with a poorly sliding coating. If desired, another hollow body can be telescopically inserted in the second, upper hollow body 19 (not illustrated).

As illustrated in FIG. 1, the hollow bodies 17 and 19 may be round. However, they can also have an oval or polygonal cross-section.

Figure 2:
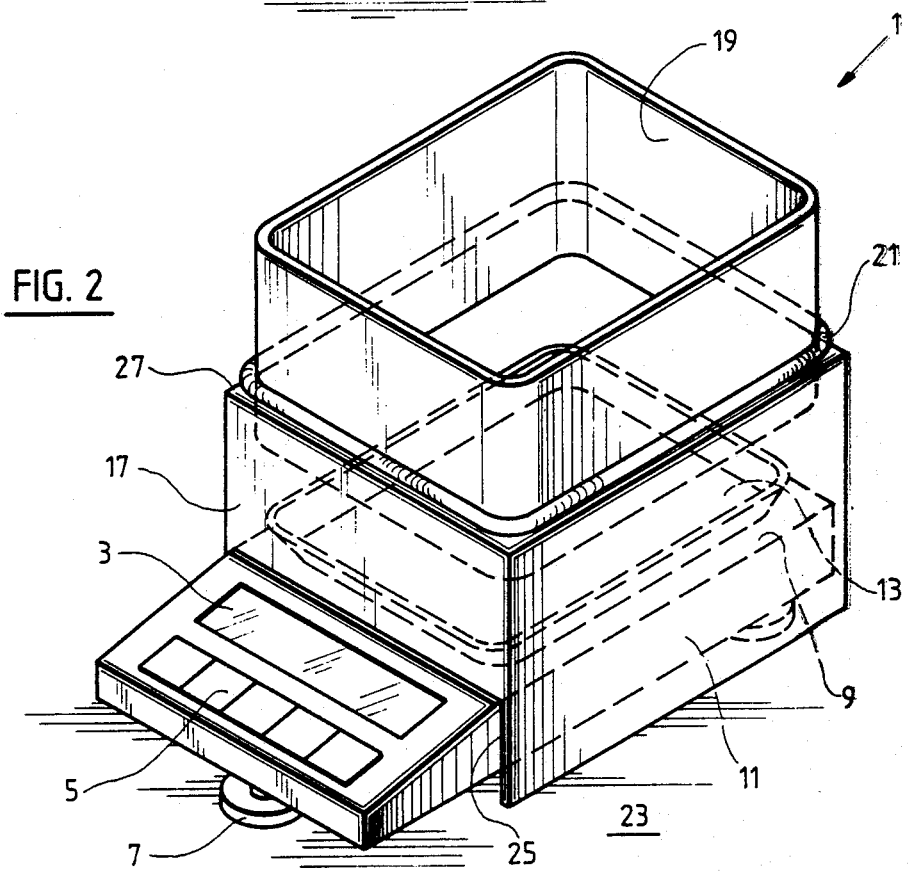
FIG. 2 is a perspective view of a balance with a rectangular draft protection device which is placed on the surface on which the balance is standing.

In the example of the invention shown in FIG. 2, the weighing dish 13 is rectangular and covers essentially the entire surface 9 of the balance housing 11. In this embodiment, the lower hollow body 17 cannot be placed on the top surface 9 of the balance housing 11 and, therefore, the lower hollow body 17 is placed on a surface 23 on which the balance 1 is also placed, for example, a table. The first hollow body 17 has a recess 25 on the side facing the person operating the balance, so that the operating and indicating instruments 3 and 5 remain freely accessible outside of the hollow body 17.

In the embodiment shown in FIG. 2, the intermediate ring 21 is also adjusted to the cross-section of the upper hollow body 19 and is placed on the outer surface of the upper hollow body 19 in a self-locking manner. If the intermediate ring 21 is of rubber, the ring 21 rests essentially snugly fitting against the corners; however, if ring 21 is of a springy metal, a pressure can be obtained in the region of the plane surfaces of the second hollow body 19 by an appropriate bending of the straight portions of the ring.

The two hollow bodies 17 and 19 are not fixedly connected to the balance 1 and, if desired, can be placed on the balance or, as illustrated in FIG. 2, can be placed on a surface 23 on which the balance stands.

When the material or article to be weighed has a small height, the two hollow bodies 17 and 19 can be slid into one another, so that the total height H thereof corresponds essentially only to the height h of the first, lower hollow body 17. If a draft protection is required for a material or an article having a greater height, the inner second hollow body 19 can be pulled out of the first hollow body 17 and the intermediate ring 23 can be moved downwardly, so that the second hollow body 19 maintains its adjusted position. When the height H of the hollow body 17 and 19 serving as draft protection is reduced, the second hollow body 19 can be slid from the top into the first hollow body 17 by applying a slight pressure and without requiring the aid of tools.

In accordance with another feature of the invention, the intermediate ring 21 can also be connected fixedly to the upper edge 27 of the first hollow body 17, so that when the second hollow body 19 is pulled out, it is not necessary to move the ring 21 manually downwardly.

A cover, not shown in the drawing, may be placed on the uppermost hollow body 19 in order to close off the weighing space. The cover may be a cover which is placed over the rim of the hollow body or a cover which is placed inside the rim of the hollow body.

The hollow bodies 17, 19 are usually made of glass or transparent plastics material However, it is possible to use other non-deformable materials.

Figure 3:
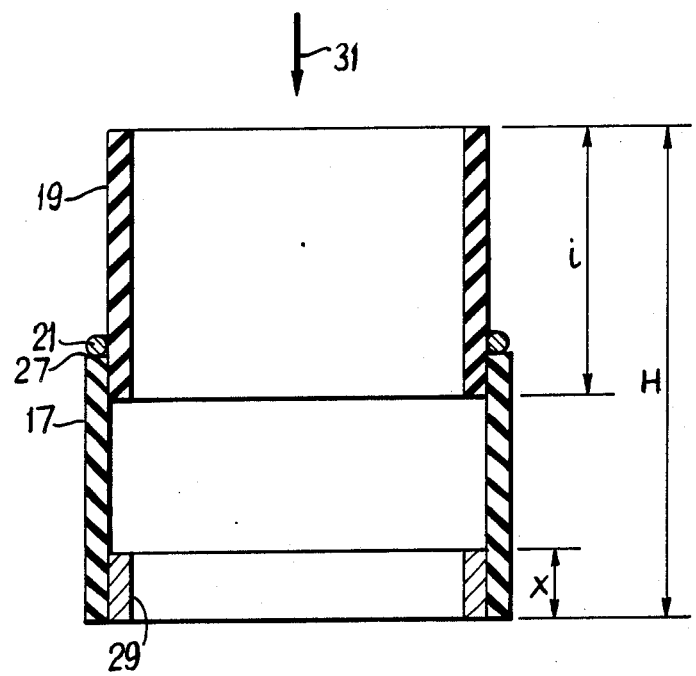
FIGS. 3 and 4 are sectional views of a draft protection device shown in two different positions of operation.
Figure 4:
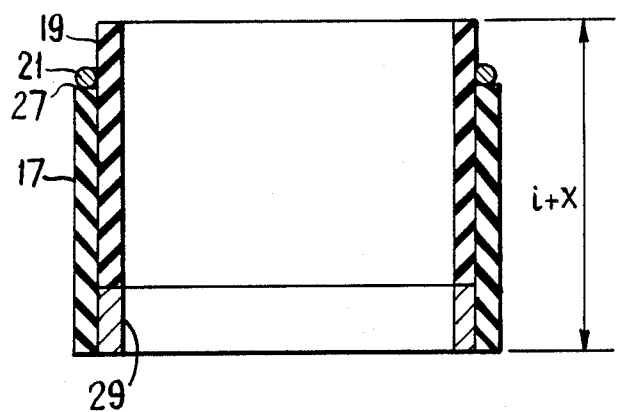

As shown in FIGS. 3 and 4, a stop rim 29 may be placed on the inside of the bottom of the lower hollow body 17. Thus, when the material or article to be weighed has a small height, and the upper hollow body 19 is slid into the lower hollow body 17 in the direction of arrow 31 shown in FIG. 3 by applying a slight pressure on the upper hollow body 19, the movement of the upper hollow body 19 will be stopped when it reaches the stop rim 29.

Accordingly in the embodiment of the present invention shown in FIGS. 3 and 4, the total height H of the draft protection device shown in FIG. 3 can be reduced to a minimum height resulting from the height i of the upper hollow body 19 plus the height x of the stop rim as shown in FIG. 4.

Since the stop rim 29 prevents the upper hollow body 19 from being pushed entirely into the lower hollow body 17, the intermediate ring 21 cannot be displaced from the upper edge 27 of the lower hollow body 17. In addition, it is always possible to grasp the upper hollow body 19 in order to pull it upwardly and out of the lower hollow body 17.

After the upper hollow body 19 has been fully pulled out of the lower hollow body 17, the upper hollow body 19 can be turned upside down and then again placed in the lower hollow body 17. The intermediate ring 21 which is in frictional engagement with the upper hollow body 19 is then near the lower edge of the upper hollow body 19 and the upper hollow body 19 can again be pushed downwardly in the direction of arrow 31 until the desired height of the draft protection device is reached. Accordingly, the upper hollow body 19 can be moved into any desired position without requiring any manual manipulation of the intermediate ring 21.

While specific embodiments of the invention have been shown and described in detail to illustrate the application of the inventive principles, it will be understood that the invention may be embodied otherwise without departing from such principles.

We claim:

1. A draft protection device for a precision balance including an exposed weighing dish, the draft protection device comprising a first hollow body surrounding the weighing dish, and at least one second hollow body, the first hollow body and the at least one second hollow body each being open at the top and the bottom thereof, the at least one second hollow body being mounted on the first hollow body so as to be telescopically slidable relative to the first hollow body.

2. The device according to claim 1, wherein the second hollow body is slidable into the first hollow body.

3. The device according to claim 2, comprising a stop rim inserted in the first hollow body at the bottom of the first hollow body, whereby the stop rim serves as a stop means for the second hollow body.

4. The device according to claims 1 or 3, wherein the second hollow body has an outer surface, an axially displaceable intermediate ring being placed on the outer surface of the second hollow body.

5. The device according to claim 4, wherein the intermediate ring is slidable in a self-locking manner on the outer surface of the second hollow body.

6. The device according to claim 4, wherein the intermediate ring is of an elastically expandable material.

7. The device according to claim 4, wherein the intermediate ring is of a springy material.

8. The device according to claim 4, the first hollow body having an upper edge, the intermediate ring being placed on the upper edge.

9. The device according to claims 1 or 3, wherein the hollow bodies have a round, oval, rectangular, or polygonal cross-section.

10. The device according to claims 1 or 3, the balance having a top surface, the first hollow body being placed on the top surface.

11. The device according to claims 1 or 3, wherein the first hollow body is supported laterally of the balance on a surface on which the balance stands.

* * * * *